May 18, 1937.  T. H. DOAN  2,080,464
METAL CUTTING MACHINE
Filed April 17, 1935  5 Sheets-Sheet 1
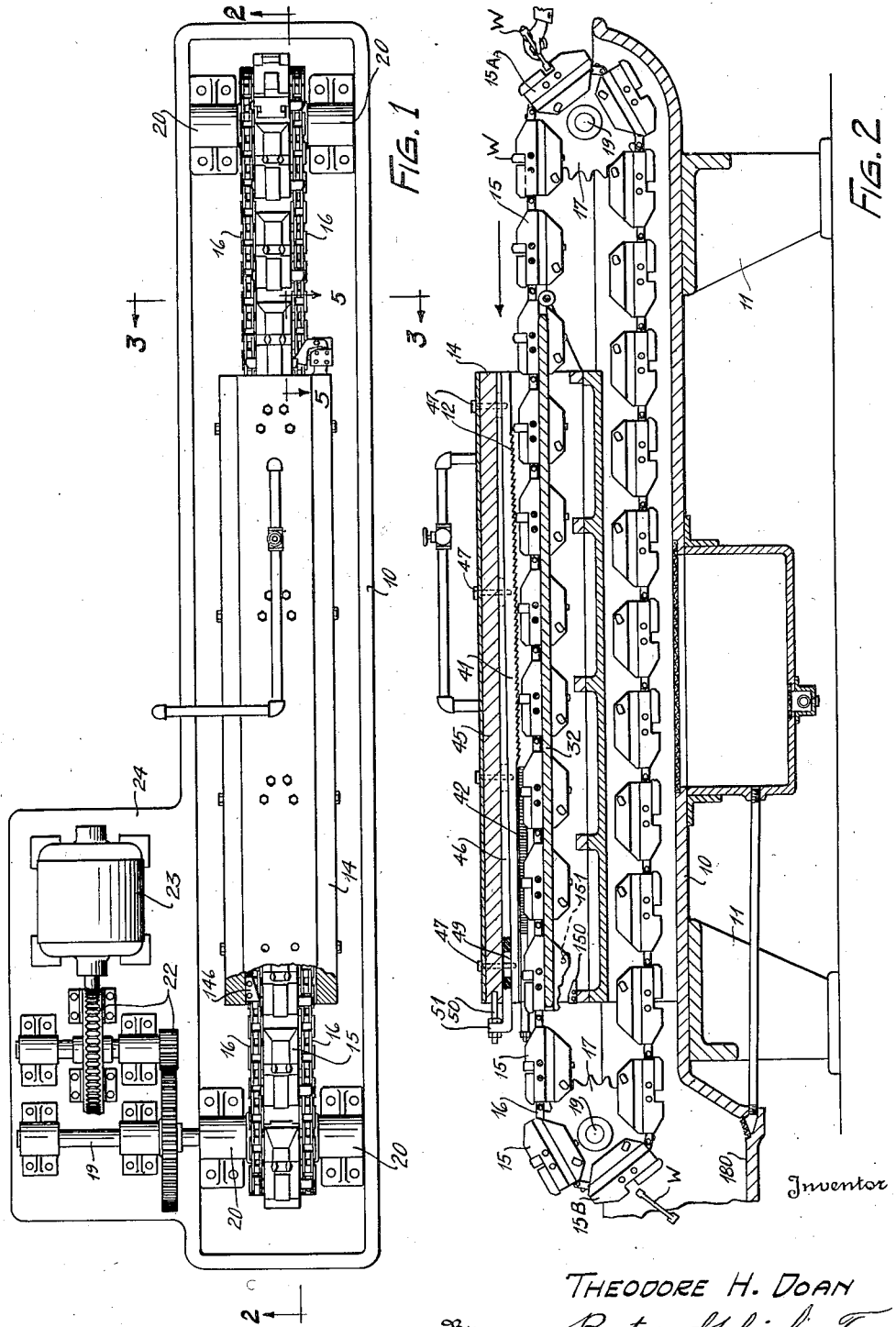
Inventor
THEODORE H. DOAN
By Bates, Goldrick & Teare
Attorneys May 18, 1937. T. H. DOAN 2,080,464
METAL CUTTING MACHINE
Filed April 17, 1935 5 Sheets-Sheet 3

Inventor
THEODORE H. DOAN
By Bates, Golrick & Teare
Attorneys

Inventor
THEODORE H. DOAN
By Bates, Golrick & Teare
Attorneys

May 18, 1937.　　　　T. H. DOAN　　　　2,080,464

METAL CUTTING MACHINE

Filed April 17, 1935　　　　5 Sheets-Sheet 5

Inventor
THEODORE H. DOAN
By Bates, Gohrick & Teare
Attorneys

Patented May 18, 1937

2,080,464

UNITED STATES PATENT OFFICE 2,080,464

METAL CUTTING MACHINE

Theodore H. Doan, Shaker Heights, Ohio, assignor to The Foote-Burt Company, Cleveland, Ohio, a corporation of Ohio Application April 17, 1935, Serial No. 16,844

12 Claims. (Cl. 90—33)

This invention concerns improvements in and in relation to metal cutting machines, and in particular to that type of metal cutting machine commonly known as a "chain broaching machine". Such machines generally comprise a frame upon which a stationary broaching tool or tools are rigidly secured. The broaches are arranged to coact with the work which is progressed past and in contact with the broaching tool. The work is carried by a series of workholders, joined together in an endless chain manner or its equivalent.

The primary object of the present invention is to provide an improved chain broaching mechanism to meet the high production requirements of modern manufacturing establishments, and which mechanism will cut or surface articles of work with a high degree of accuracy, and at a comparatively high rate of speed.

A further object is to provide a metal cutting machine with a series of interconnecting workholders, which workholders will be arranged to automatically locate the work, thereafter clamp the work in position with a high degree of accuracy.

A more specific object of the invention is the provision of a workholder for a metal cutting machine, which workholder will be arranged to automatically position the work on a locating member, thereafter clamp the work in position before the cutting action takes place, and after the cut has been made automatically eject the work from the locating member to facilitate the discharge of the work from the workholder.

Other objects of the present invention will become more apparent from the following description, which refers to a preferred embodiment of my invention shown in the accompanying drawings. The essential characteristics of said invention will be set forth in the claims.

Figure 3:
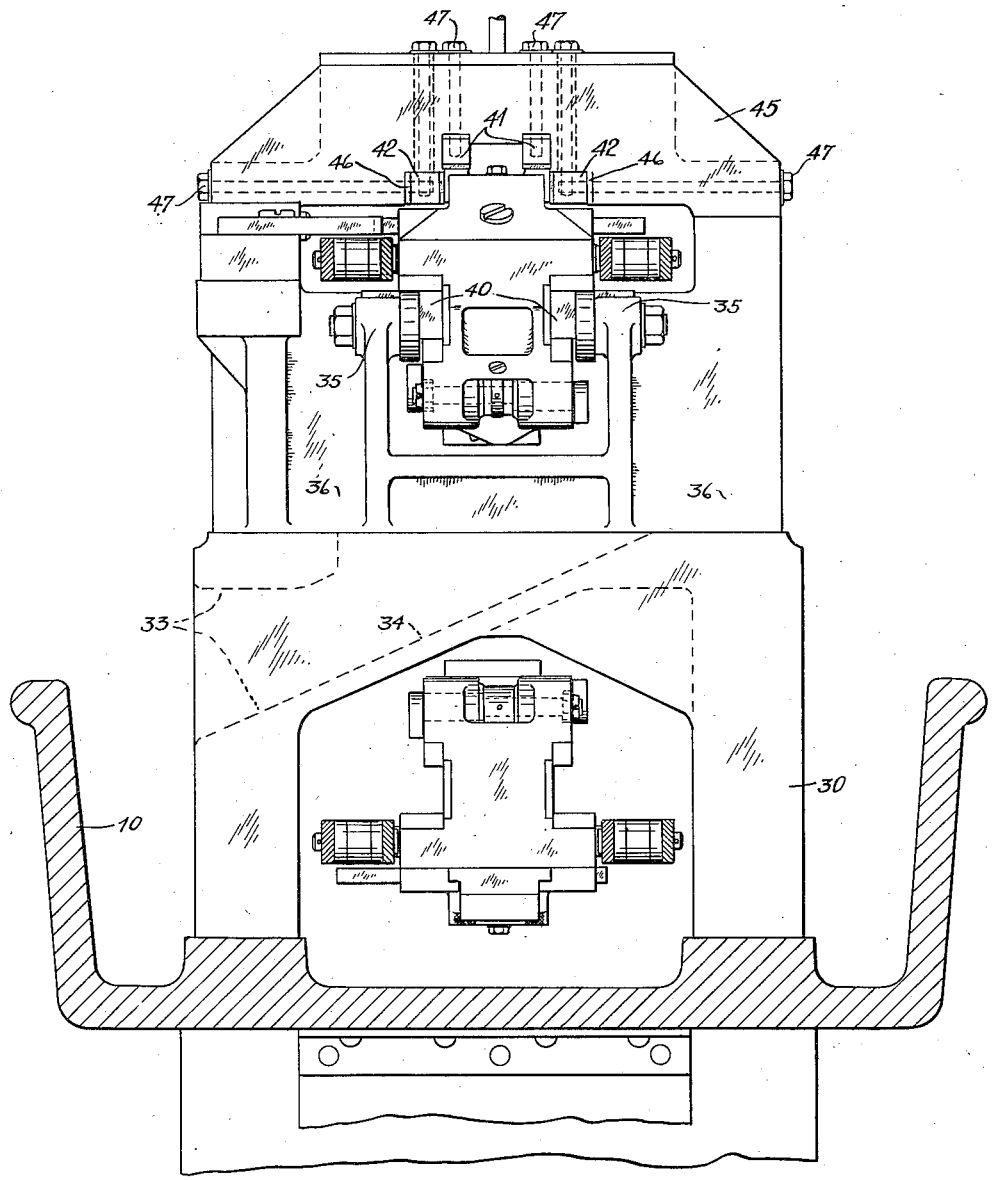
Figure 4:
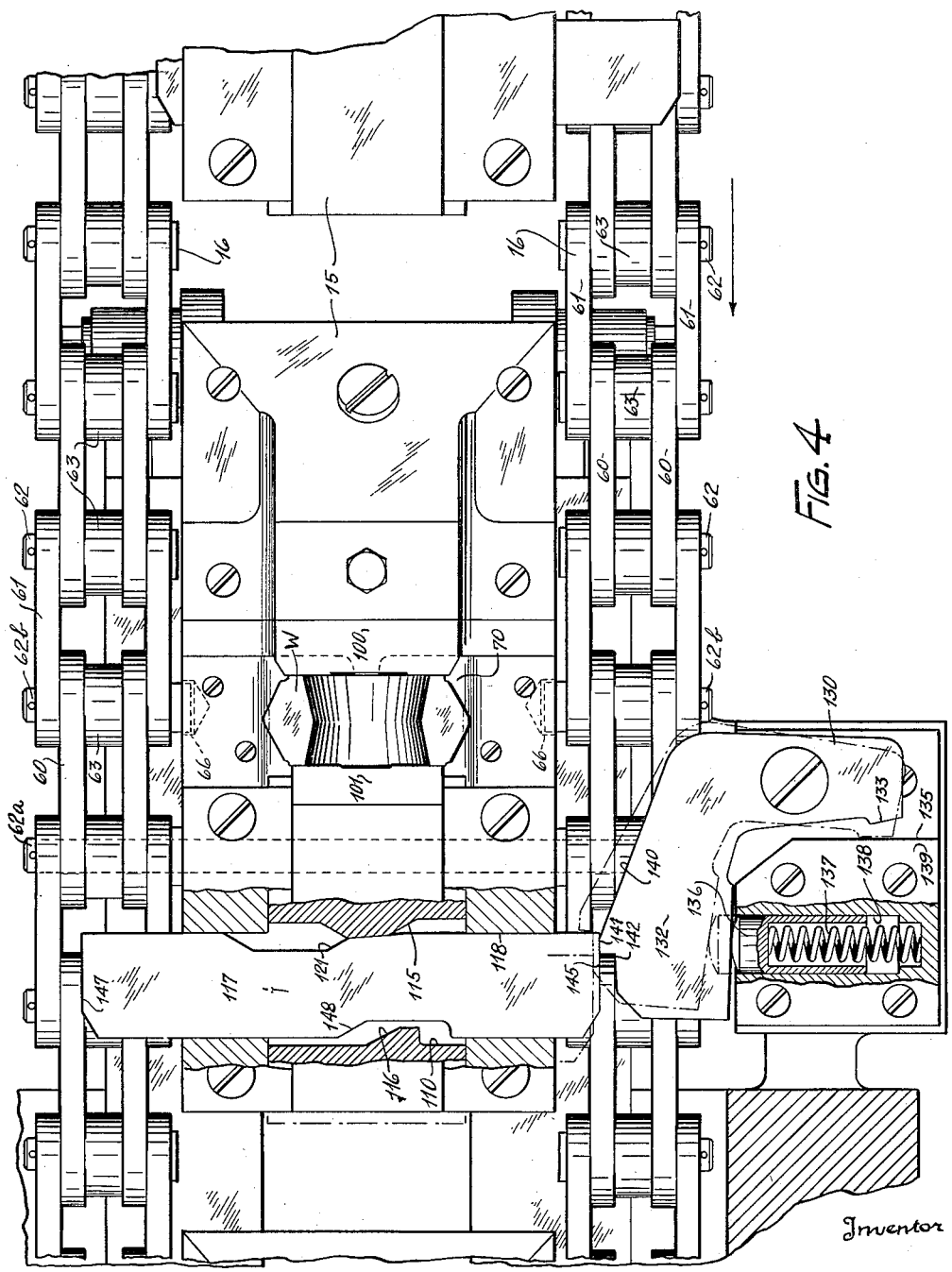
Figure 5:
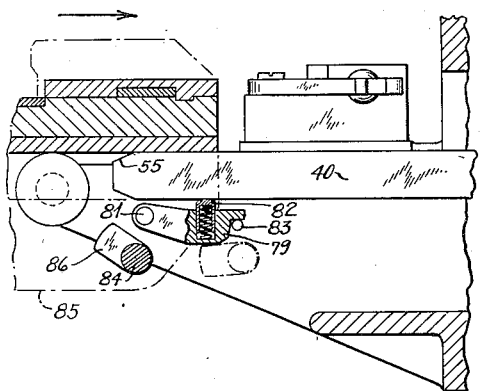
Figure 7:
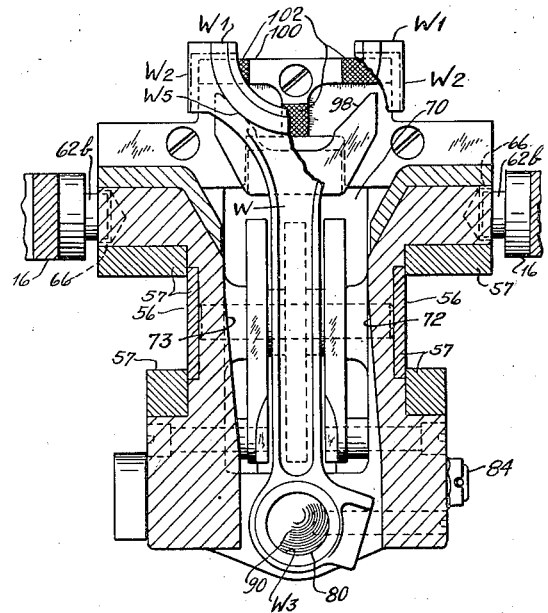
Figure 6:
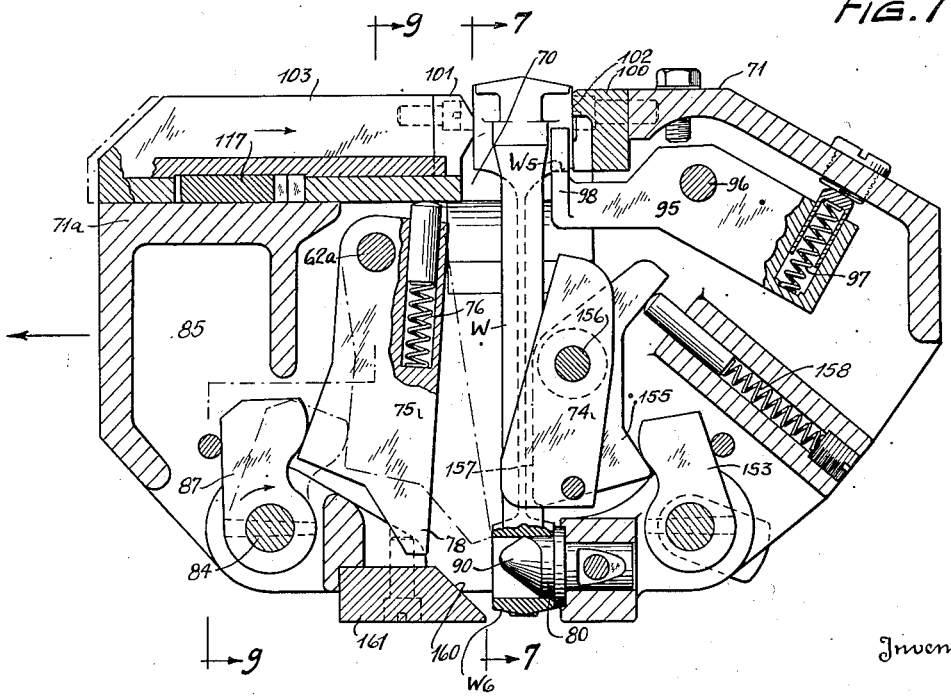
Figure 8:
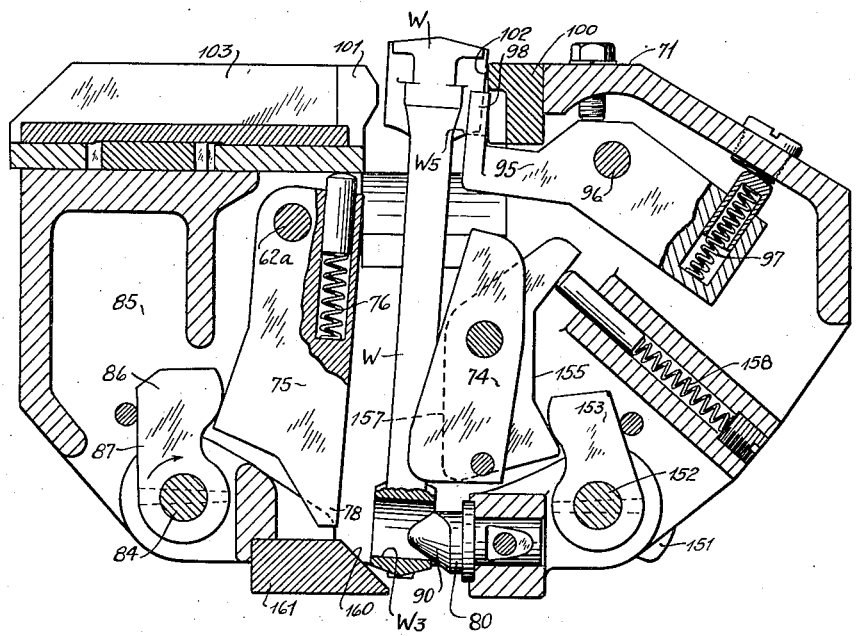
Figure 9:
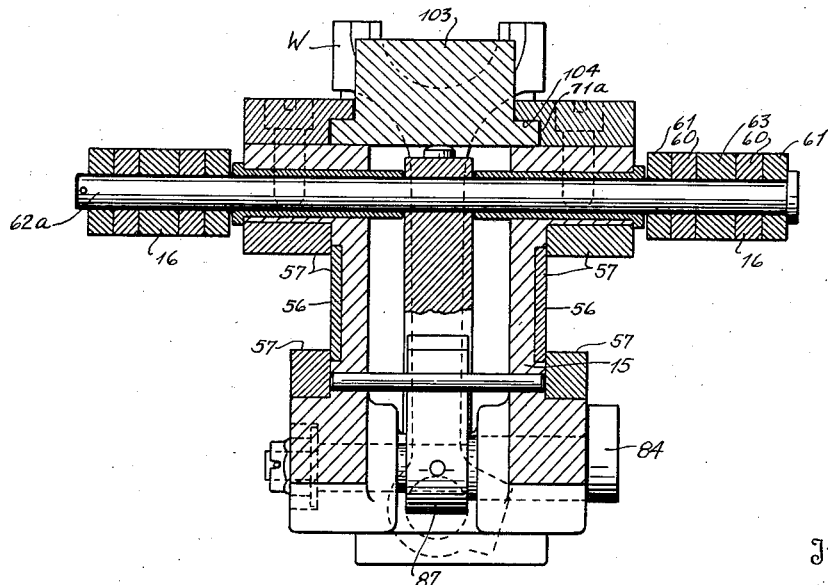

Referring now to the drawings, wherein I illustrate a preferred embodiment of my invention, Fig. 1 is a plan of a broaching machine, in which my invention is incorporated; Fig. 2 is a substantially centrally located vertical section as indicated by the line 2—2 on Fig. 1; Fig. 3 is a vertical transverse section, as indicated by the line 3—3 on Fig. 1; Fig. 4 is a plan view on an enlarged scale of a workholder together with cooperating mechanism carried by the machine frame, certain parts being broken away to more clearly illustrate the internal construction; Fig. 5 is a sectional detail of the plane of the section, indicated by the line 5—5 on Fig. 1; Fig. 6 is a longitudinal section of the workholder, the plane of the section indicated by the line 6—6 on Fig 3; Fig. 7 is a transverse section of the workholder indicated by the line 7—7 on Fig. 6; Fig. 8 is a section similar to Fig. 6, but illustrating certain of the parts in a different position; Fig. 9 is a transverse section through the workholder, the plane of the section being indicated by the line 9—9 on Fig. 6.

The present invention contemplates the position of a chain broaching machine, having an improved workholding mechanism so constructed to occupy a comparatively small space, and yet which will enable rapid automatic positioning, clamping, releasing and ejecting of the work with a high degree of accuracy, and which will position and clamp the work in the workholders in a manner to prevent chattering of the work relative to the workholder.

My improved broaching machine also includes a novel arrangement, for resiliently positioning the work in the workholder, together with the mechanism actuated thereafter for positively positioning or clamping the work in position, as well as mechanism to positively eject the work from the positioning or locating mechanism.

The frame of my improved broaching machine comprises, as shown, an elongated hollow base member 10, supported by suitable legs 11, and arranged to provide a receptacle for chips or waste material resulting from the broaching operation. The broach 12 is carried by a bridge-like structure 14, mounted on the frame intermediate its ends. The work or material to be broached is removably carried by a series of workholders 15, which, as will be hereinafter more fully described, are carried by and between a pair of chains 16. The chains are mounted on or looped about suitable sprockets 17, rigidly secured to respective shafts 19 mounted in bearings 20, carried by the frame 10. The general arrangement of the mechanism is such that the shaft 19, which supports the left-hand sprockets 17, as shown in Figs. 1 and 2, is driven through a gearing 22 from a suitable source of power, such as a motor 23 supported on a table-like portion 24 on the frame 10.

The motor and gearing are arranged to progress the upper stretches of the chain 16 and the workholders 15 carried thereby toward the left (Figs. 1 and 2) to convey the work or material to be broached past the stationary broaching supported by the frame structure, heretofore mentioned.

The bridge or broach-supporting structure 14, which supports the broaching tools, also provides a supporting surface or guide for the workholder 15, during the broaching operation. As shown in Figs 2 and 3, the bridge 14 comprises an elongated H-shaped structure 30, arranged to be rigidly secured to the bed of the machine. The upper stretches of the chains 17 and the workholders carried thereby pass between the upper portions of the side walls of the structure. The lower or return stretches of the chain pass between the lower portions of such side walls. A cross member 32 interconnects the side walls of the structure and forms a shelf below the upper stretch of workholders and prevents chips and other waste material, resulting from the broaching action, from falling onto the lower stretches of the chain or the workholders. One side wall of the structure 30 is provided with a series of openings or passageways 33 arranged to communicate with the upper chain passage in which the work is broached. The upper surface 34 of the cross member 32 is bevelled to cause cutting fluid to readily carry away the chips, through the openings 33, to the basin-like frame member 10.

The structure 30 is arranged to guide and support the workholders during the broaching operation. The work holder supporting surface of the structure is formed by a pair of longitudinally extending bars 35, which are integrally joined with the walls of the structure 30 by a series of suitable transverse webs 36. The bars 35 are spaced apart from the side walls of the structure 30 to readily permit the passage of chips therebetween. Rigidly secured to the inner surface of each bar 35 is a longitudinally extending bearing rail 40 arranged to provide a wearing and supporting surface for the workholders, as will be hereinafter more fully described.

The broaches 12 are adjustably carried by the structure 14. As shown in Figs. 2 and 3, I have provided two pairs of broaches, one pair 41 of which is arranged to engage the top face of the work carried by the workholders, while the other pair 42, are arranged to engage the sides of the work adjacent the top thereof. Each broach 41 and 42 comprises an elongated toothed bar, carried by an upper frame cap 45 which is secured to and bridges the legs of the H-shaped structure 30.

The broaches are threadingly engaged by suitable bolts 47 carried by the cap 45 and arranged to retain the broaches in position against bars 46 which are interposed between the broach and the cap 45. The bars are provided with elongated slots 49, through which the bolts 47 pass, and are adjusted by means of suitable adjusting screws 50, rigidly secured in the cap member 45, and adjustably secured to an upstanding lug 51 of their respective bars 46 by suitable lock nuts. The bolt openings in the cap 45 are larger than the bolts to permit adjustment of the wedge bars and broaches without binding the bolts 47 in the cap.

As heretofore mentioned, the chains 16 which carry the workholders, are in the form of continuous loops passing around suitable sprockets 17. Each chain 16 is formed by a series of pairs of links 61 which are interconnected by suitable pivot pins 62. The pins are provided intermediate the links with usual rollers 63, to coact with the teeth of the chain sprockets 17, thereby eliminating undue friction.

Each workholder 15 is provided with a positioning and clamping mechanism arranged to accurately position and clamp the work therein for the broaching operation. The workholders illustrated in the drawings have been especially adapted to receive, position and clamp an automotive connecting rod W to have the surfaces W1 and W2 machined or broached by the cutting tool.

As shown in the drawings, the workpiece W is inverted and dropped by the operator through an opening 70 in the top wall 71 of the workholder. The lower portions of the workpiece are guided loosely between side walls 72 and 73 (Fig. 7) of the workholder, and a pair of end walls, one of which is formed by spaced stationary guide members 74, and the other of which comprises a movable arm 75. Such walls guide the workpiece W toward the position shown in Fig. 8. When the enlarged lower end of the workpiece passes below the lowermost portions of the guide 74, the reduced intermediate section of the work falls between the two stationary guiding members 74 and an opening W3 of the workpiece, which has previously been machined in a precision-cutting operation, engages a locating pin or stud 80, as illustrated by the workpiece W in Fig. 8. In this position the upper portion of the workpiece is supported by a lever 95.

As indicated in Figs. 1 and 2, the work chain extends some distance to the right of the H structure and broaching tool. This permits the work, placed in a workholder, as, for instance, in the workholder 15A, shown at the extreme right-hand end of Fig. 2, to settle into the position shown in Fig. 8, before the workholder reaches the broach.

Each workholder is mounted between the chains 16. As shown, certain of the pins 62, for instance, the pin 62a on Figs. 4 and 9, are common to both chains and pass through a workholder. Thereafter, the next succeeding pin of each chain, for instance, the pins 62b (Fig. 4) extend inwardly a slight distance entering an enlarged recess 66 in the opposite side walls of the workholder. Thus, the workholder is supported entirely by the chain when it is outside of the H structure. As a workholder enters the tunnel formed in the upper part of the H structure, it is drawn into contact with the guide rails 40, the ends of which are tapered as indicated at 55 in Fig. 5, to permit recesses 56 formed in the side walls of the workholders to readily engage the rails, whereupon the rails serve to support and guide the workholder independent of the chain, while the workholder is passing through the tunnel. The faces of the workholder which engage the rails 40 are as indicated in Fig. 7, provided with hardened bearing bars 57, which are secured to the workholder in any well known manner. The chains therefore serve only to progress the workholder through the tunnel and to support the workholders when they are out of range of the cutting tools.

When the work has been positioned, as shown in Fig. 8, the workholder approaches the right-hand entrance to the tunnel Fig. 2 (or the left-hand entrance as shown in Fig. 5) whereupon a spring-pressed cam 79 acts to rock the arm 75 about its pivot pin 62a, against the action of a compression spring 76, causing the lowermost end thereof to engage the work and force it into engagement with the locating pin 80.

As shown in Fig. 5, the cam 79 comprises a pivoted lever pivoted as at 81 to the machine frame and provided with a suitable spring-pressed plunger 82 normally acting to urge the cam into contact with a stationary pin 83. Mounted on a rock shaft 84, journalled in the side walls 85 of the workholder, is a cam arm 86, which is arranged to contact with the cam 79, just prior to the entrance of the workholder in the tunnel. This serves to rock the shaft 84 and together with it a lever 87, which is drivingly secured to such shaft within the body of the workholder. As the lever 87 rocks in a clockwise direction, as indicated by the arrow in Fig. 6, it engages the pivoted arm 75, causing it to be rocked about its pivot against the action of the spring 76, whereupon the lowermost end 78 of such arm engages the lower portion of the workpiece W, urging the workpiece onto the locating pin 80.

The locating pin 80 is provided with a tapered head 99, which, as the arm 75 forces the work towards the pin, causes the workpiece to be drawn downwardly, rocking the pivoted lever 95 about its pivot 96 against the action of a compression spring 97. As shown in Fig. 7, it will be noted that the lever 95 is provided with a V-shaped head 98, which engages a substantially cylindrical surface W5 on the workpiece, thereby centering the top of the workpiece by rocking it about the axis of the pin 80.

After the work has been positioned on the locating pin 80, and centered due to the action of the spring 97, the upper portion of the workpiece is gripped between a pair of hardened clamps 100 and 101, the former being rigidly secured to the top wall of the workholder, and provided with a work-engaging face 102 adapted to contact with that surface of the work next adjacent thereto. The clamp 101 is secured to a slide 103, arranged for reciprocation toward and away from the contact surface 102 in a suitable guideway 104, formed in the upper surface 71a of the workholder.

The slide 103 is provided on its lower surface with a recess 110, having, as shown in Fig. 4, a pair of cam surfaces 115 and 116, arranged to be alternately engaged by a transversely slidable bar 117, mounted in suitable slots 118 in the side walls of the workholder. Immediately before the workholder reaches the cutting tunnel and broaches, the wedge bar is moved in the direction of the arrow in Fig. 4, whereupon the cam surface 115 of the slide is engaged by a cam surface 121 on the wedge bar, moving the slide in the direction of the arrow in Fig. 6, causing the work to be gripped between the clamps 100 and 101.

The mechanism for operating the wedge bar is shown and claimed in pending application of Edward Nygren, filed in the U. S. Patent Office February 12th, 1932, Serial No. 592,574, and assigned to my assignee. The action of such mechanism is to simulate the hammer blow that a workman would normally give the plunger were he to manually strike it.

Pivotally mounted in a forwardly extending portion of the H structure, is a bell crank 130, one arm 132 of which extends outwardly toward the workholder, the other arm of which is provided with a face 133, arranged to engage a frame surface 135 to prevent an overthrow of the arm and to limit the position of the bell crank not in engagement with a plunger 117. As shown in the drawings, and especially Fig. 4, the arm 132 of the bell crank is normally urged toward the workholder by a plunger 136, through the medium of a suitable compression spring 137, both of which are mounted in a cylindrical opening 138 in a frame member 139. The arrangement is such that the spring normally urges the arm 132 of the bell crank toward the workholder and into the path of the wedge or plunger 117.

The chain and workholder normally progress in the direction of the arrow Fig. 4, therefore, when a plunger 117 strikes the surface 140 of the bell crank 130, that plunger will be resiliently cammed inwardly. The spring 137 is of sufficient strength to cause the clamps 100 and 101 to securely grip the work, thereafter continued movement of the plunger along the cam surface 140 of the bell crank 130 compresses the spring 137. As shown, the left-hand portion of the cam surface 140 of the bell crank 130 cut back as at 141, forming an abruptly interrupted surface 142. Hence, as the workholder continues in its movement, the plunger 117 will ride past the end of the cam surface 135, whereupon the spring 137 will cause the surface 142 to be brought sharply into contact with the end 145 of the plunger. This, therefore, imparts a hammer-like blow to the plunger, very similar to that blow a workman would manually deliver with a hammer. This blow serves to positively clamp the work between the two clamping surfaces 100 and 101, in such a manner that the action of the broach will not cause the work to chatter or jar loose in the workholder.

As the workholder nears the end of the tunnel, a suitable cam 146, as shown in Fig. 1, engages the end 147 of the wedge bar 117, forcing it in a direction opposite to that of the arrow shown in Fig. 4, causing the cam surface 148 thereof to engage the cam surface 116 of the slide 103 and withdraw the clamping member 101 from contact with the work.

Shortly after the work has been released by the clamping members, a cam 150 (Fig. 2) mounted on the tunnel structure 14 engages an arm 151 (Fig. 6) which arm is rigidly secured to a shaft 152, rotatably mounted in the side walls 85 of the workholder. Pinned to this shaft, within the workholder, is a second arm 153, which, consequent upon the movement of the arm 151 under impulse of the cam 150, engages an ejecting lever 155, rocking such lever about its pivot 156, against the action of a compression spring 158 and causing the surface 157 thereof to engage the intermediate shank of the workpiece W, forcing it from engagement with the locating stud 80. As the work is forced from engagement with the stud 80, the lowermost end of the work, for instance that surface indicated by the reference character W6, engages a bevelled surface 160 of a block 161 which, together with the action of the lever 95, under the influence of the spring 97, forces the work from engagement with the locating stud upwardly into the workholding recess of the workholder, so that consequent upon the workholder rounding the left-hand end of the machine, as indicated by the workholder 15B in Fig. 2, the work will readily fall therefrom into a receiving receptacle, such as a basin 180, formed in the frame.

I claim:

1. The combination with a metal cutting machine, of a series sequentially movable workholders each arranged to individually retain work to be operated upon, sequentially operable mechanism carried by each workholder to position the work in the workholders, each mechanism including a relatively stationary locating member carried by the workholder, means to force the work onto said member, means to center the work relative to said member, means to clamp the work in position to be operated on, means to release said clamping means, and means to eject the work from the locating member.

2. The combination with a metal cutting machine of a series of sequentially movable workholders, each workholder being arranged to retain work having an opening therein to be operated on, means to position work in each workholder, including a locating pin, means to guide the work to a position wherein the opening is adjacent said pin, means to force the work on said locating pin, means to swing the work about said pin to thereby center the work, and means to clamp the centered work in position in the workholder.

3. The combination with a metal cutting machine, of a series of sequentially movable workholders each arranged to retain a workpiece to be operated upon, means to position the work in the workholders, including a relatively stationary locating pin carried by the workholder, means to force the work onto said pin, resilient means to swing the work about the axis of said pin, means independent of said aforesaid means to clamp the work in position to be operated on, means to release said clamping means, and means to eject the work from the pin.

4. In a metal cutting machine having a metal cutting tool, a workholder arranged to retain work to be operated on by the tool, including a locating member, means to position the work on said locating member, means to center the work relative to said locating member, consequent upon the action of said positioning means, means independent of said positioning and centering means to clamp the work in the workholder, means to release said clamping means, means to eject the work from said locating means, and wherein said resilient means moves the work outwardly relative to said workholder consequent upon such ejection of the work.

5. The combination with a metal cutting machine, of a series of workholders pivotally interconnected in an endless chain formation, a pair of annular members around which the chain is looped, means to progress the chain, each workholder including a work locating member, means to force the work onto the locating member consequent upon the progress of the chain, resilient means to center the work relative to said locating member, means carried by each workholder and independent of the locating means to clamp the work in position in the workholder, said means being operable to clamp and unclamp the work consequent upon the progress of the chain, and means acting after the clamp has been released to eject the work from the locating means.

6. A workholder for a metal cutting machine adapted to receive elongated workpieces having cylindrical openings therein, said workholder having a locating pin, a pivoted arm carried by the workholder and arranged to force the work onto said pin, means to clamp the centered work in position in the workholder, means to release said clamping means, and a lever adapted to engage the work to force it from engagement with said locating pin.

7. A workholder for a metal cutting machine adapted to receive elongated workpieces having cylindrical openings therein, said workholder having a locating pin, means to force the work onto said pin, means to swing the work about the axis of said pin, including a member having a V-shaped work engaging surface, resilient means to force said surface against the work, means to clamp the centered work in position in the workholder, means to release said clamping means, means to force the work from engagement with said locating pin and permit the centering means to move the work outwardly relative to the workholder.

8. A workholder for a metal cutting machine adapted to receive elongated workpieces having cylindrical openings therein, said workholder having a locating member, a pivoted arm carried by the workholder and arranged to force the work into engagement with said member, centering means to swing the work relative to said member, including a V-shaped work engaging surface, resilient means to force said surface against the work, means to clamp the centered work in position in the workholder, means to release said clamping means, means to force the work from engagement with said locating member and permit the centering means to move the work outwardly relative to the workholder.

9. A workholder for a metal cutting machine adapted to receive an elongated workpiece having a cylindrical opening in one end thereof, said workholder having a locating pin, a pivoted arm carried by the workholder and arranged to force the opening in the work into engagement with said pin, means engaging the other end of the work to swing the work about the axis of said pin, said last-named means including a member having a V-shaped work engaging surface, resilient means to force said surface against the work to center the work, means to clamp the centered work in position in the workholder, means to release said clamping means, means to force the work from engagement with said locating pin and permit the centering means to move the work outwardly relatively to the workholder.

10. In a metal cutting machine, a workholder having a guideway for the work, a pivoted work-supporting member, resilient means to retain said member in contact with the work, a work locating member having a cam surface, means to force the work onto the locating member against the action of said supporting member, and means adapted to act thereafter to clamp the positioned work.

11. In a metal cutting machine, a workholder, said workholder having a guideway comprising a pair of members spaced to permit entrance of one portion of the work when aligned therewith and to prevent entrance of other portions of the work, a locating member at one end of said guideway, means to force one end of the work into engagement with said member, means to rock the work relative to said member to align the other end of the work, and means acting thereafter to clamp the aligned work.

12. A workholder for a metal cutting machine, adapted to receive a workpiece having an opening therein, including a locating pin, means to force the work onto said locating pin, means to rock the work about the axis of said pin, means to clamp the positioned work in the workholder, means to release said clamping means and means to eject the work from the locating pin.

THEODORE H. DOAN.